United States Patent Office 3,325,433
Patented June 13, 1967

3,325,433
COATING PAPERBOARD CONTAINERS WITH AQUEOUS DISPERSION OF POLYOLEFIN CONTAINING A WERNER COMPLEX
John W. Trebilcock, Wilmington, Del., assignor to E. I. du Pont de Nemours and Company, Wilmington, Del., a corporation of Delaware
No Drawing. Filed May 11, 1964, Ser. No. 366,611
1 Claim. (Cl. 260—29.6)

This invention relates to aqueous emulsions containing a Werner type complex. More particularly, this invention relates to stable aqueous emulsions comprising polyethylene or polypropylene polymers and copolymers, and a water soluble complex of the Werner type in which a trivalent chromium atom is coordinated with a carboxylic acid.

In the formation of an emulsion of a polymer in water it is usually necessary to have present an emulsifying agent. The emulsifying agent is soluble in the water phase and acts to decrease the surface tension between the polymer and the water. Most emulsifying agents also act as a stabilizing agent to prevent coalescing of the molecules and subsequent deemulsification. However, when an emulsion of polyethylene or polypropylene is applied to a surface and allowed to dry the emulsifying agent drys out with the polymer coating and carries into the coating thus formed the inherent properties of the emulsifying agent. The ultimate result of this is to impart to the coating undesirable properties which have long been a problem in the industry.

According to the present invention it has been found that admixing a water soluble Werner type chromium complex with an emulsion of polyethylene, polypropylene or their copolymers, produces a composition which when dried, no longer exhibits those undesirable properties associated with the use of an emulsifying agent.

A totally unexpected result of the present invention is the unusual mar-preventive property of films formed from compositions of this invention. For example, if paperboard containers which are used to ship bananas and other fruits, are coated with the compositions of this invention, the components of the composition coact in a manner, not understood, to form a coating on the containers which greatly decreases the amount of marring which the skin of the bananas and other fruits normally suffer upon contacting the containers. Further, most fruits, such as bananas, are packed while wet and the coating formed from the emulsions of this invention have added desirability because of their water repellency and vapor permeability.

POLYETHYLENE AND POLYPROPYLENE EMULSIONS

Emulsions of polyethylene or polypropylene can be prepared from polymers and copolymers whose molecular weight ranges from about 1000 to about 25,000. The emulsions can be prepared by any of the methods commonly used in the art.

A representative method for preparing a low molecular weight polymer emulsion is to add the emulsifying agent to a melt of the low molecular weight polyethylene or polypropylene at 230 to 250° F. and then to add this melt to hot water with rapid agitation. The polymer will be emulsified as the melt is slowly added into the vortex of the hot water. The emulsion can then be cooled or diluted to the strength desired.

Although emulsions can be prepared which contain more than 40% by weight based on the weight of the emulsion of polyethylene or polypropylene, emulsions containing about 35% or less are preferred.

Commercially available polymer emulsions, such as "Poly-Em" 40, a high molecular weight nonionic polyethylene emulsion sold by Spencer Chemical Company, can be used in the compositions of this invention if desired.

Anionic, cationic or nonionic polymer emulsions can be prepared depending upon the type of emulsifying agent used. The cationic and nonionic emulsions are used in the compositions of this invention because of their compatibility with chrome complexes which are cationic. Examples of cationic emulsifying agents which can be used are quaternary salts or amine salts. Nonionic emulsifying agents can be, for example, polyoxyethylene fatty alcohol ethers and polyglycol fatty acid esters.

CHROME COMPLEXES

Werner complexes and their preparation in which a trivalent chromium atom is coordinated with a carboxylic acid are old in the art, being described in many patents including Iler U.S. Patent No. 2,273,040, issued Feb. 17, 1942; Iler U.S. Patent No. 2,356,161, issued Aug. 22, 1944; Goebel and Iler U.S. Patent No. 2,544,666, issued Mar. 13, 1951; and Ried U.S. Patent No. 2,662,835, issued Dec. 15, 1953.

The water soluble chromium complexes used as a part of this invention are those in which a trivalent chromium atom is coordinated with a carboxylic acid. The following chromium complexes are representative of those which can be used in the preparation of the compositions of this invention.

(1) The chromium complexes of aliphatic monocarboxylic acids, straight or branched-chain saturated acids which are insoluble or poorly soluble in water. The most preferred of these acids are myristic, palmitic and stearic acids.

(2) The chromium complexes of the halogenated carboxylic acids of the formula (1) $$R(CX_2)_nCOOH$$

where R is hydrogen, trifluoromethyl or chlorodifluoromethyl, X is fluorine or chlorine and $n$ is a positive integer of at least 4, with the proviso that (a) when R is trifluoromethyl, all of the halogen atoms must be fluorine, (b) when R is chlorodifluoromethyl, at least two-thirds of the halogen atoms must be fluorine, and (c) when R is hydrogen, at least half of the halogen atoms must be fluorine and $n$ must be divisible by 2. The most preferred of these acids is perfluorooctanoic acid.

(3) The chromium complexes of monocarboxylic acids made up of a carboxyl radical joined to an alpha,beta-unsaturated carbon chain containing from two to six carbon atoms. The post preferred of these acids is methacrylic acid.

(4) The chromium complexes of trihydroxy benzoic acids or compounds capable of yielding a trihydroxy benzoic acid. The most preferred of these acids are gallic acid and tannic acid.

A chromium complex solution, known as the chrome complex commodity, containing up to 50% by weight of the chromium complex, based on the weight of the solution, can be prepared. Practical solutions, however, contain about 30% by weight or less of the chromium complex.

COMPOSITIONS OF THE INVENTION

Stable compositions containing cationic or nonionic polyethylene or polypropylene emulsions and a chromium complex of a carboxylic acid can be easily prepared by adding a solution of the chromium complex to the polyethylene or polypropylene emulsion while stirring.

Practical, upper and lower limits for the amount of the chrome complex commodity used in the compositions this invention would be about 0.1% to about 20% weight based upon the weight of the composition. Similar practical limits would apply to the amount of polymer used in the compositions of this invention. A representative, though not intended to be limiting, treating composition would contain about 0.5% to about 10% by weight polyethylene and about 0.2% to about 10% by weight chromium complex commodity based on the total weight of solution.

The compositions of this invention can be applied to the substrates to be treated in any suitable manner such as by spraying, roller coating, brushing or dipping the material into a quantity of the formulation. A preferred procedure comprises contacting the material with a composition of this invention and then passing the material between rolls to adjust the liquid pickup of the material.

The quantity of composition applied will vary according to the intended use and the concentration of the individual components, but normally from 10 to 150 pounds of solution per 10,000 square feet of surface is preferred. In normal practice the treated material will be dried at elevated temperatures to remove water.

As pointed out previously, the compositions of this invention are useful in coating packaging material and shipping containers for bananas and other fruits. The compositions are also useful in the treatment of textiles and textile fibers. Of special interest are compositions of polyethylene emulsions with chromium complex bonding agents, such as the chromium complex of methacrylic acid. When these compositions are applied to fiberglass, the polyethylene acts as a film-forming binder and lubricant for the delicate, easily self-abraded glass fibers while the chromium complex of methacrylic acid improves the bonding of the glass fibers to thermosetting resins, such as polyester resins.

The compositions of this invention are also effective materials for improving polishes, such as floor polishes, and for coating paper or packaging material to be used in the shipment of highly polished products.

It is understood that other materials can be added to the compositions of this invention. For example, in some instances, it may be desirable to add neutralizers such as dilute ammonium hydroxide to raise the pH of the compositions. Also if desired, binders, lubricants, wetting agents or anti-foam agents can be added to the formulations of this invention to improve treating characteristics or the properties of the treated materials.

This invention will be further described but is not intended to be limited by the following illustrative examples, wherein parts and percentages are by weight unless otherwise indicated.

*Example 1*

A nonionic composition of an emulsifiable polyethylene having a melting point in the 213 to 221° F. range is prepared as follows: A mixture containing 25 parts of the emulsifiable polyethylene and 5 parts of a fatty alkylolamide type emulsifying agent are melted together with agitation at 250° F. When the mixture appears uniform, it is slowly added to 70 parts of 210 F. water with rapid agitation. When the addition is completed, the rate of stirring is decreased and the emulsion is allowed to cool to room temperature.

A solution containing the nonionic polyethylene emulsion and a chromium complex of stearic acid is prepared by adding 5 parts of the emulsion to 90 parts of water with agitation, followed by adding 5 parts of stearato chromic chloride having a chromium to acid mole ratio of 2:1 and containing 5.7% chromium. The formulation exhibits good stability.

This formulation is used to treat corrugated paperboard. The formulation is applied with a wiper bar to the smooth side of the corrugated board at an average loading of 150 lbs. of solution per 10,000 square feet of corrugated board. The treated corrugated board is used as inserts in boxes used to ship bananas with the treated side contacting the bananas. A similar box using untreated corrugated board inserts is also prepared. The boxes are filled with "hands" of green bananas and conditioned at a high humidity. The filled boxes are then vibrated to simulate shipping conditons. Upon examination of the bananas, after completing the vibrating and aging for 24 hours, it is found that the treated box reduces the damage to the banana skins by over 50%.

*Example 2*

A cationic polyethylene emulsion is prepared by melting 25 parts of emulsifiable polyethylene with 3 parts of a cationic emulsified containing ethylene oxide condensation products of primary fatty amines and 2 parts of a cationic emulsifier containing n-alkyl trimethyl ammonium chlorides to a maximum temperature of 250° F. When a uniform melt is obtained, it is slowly added to 70 parts of 210° F. water with agitation. When all the melt is added the amount of agitation is reduced and the cationic emulsion is allowed to cool to room temperature.

A formulation containing the cationic polyethylene emulsion and a chromium complex is prepared by adding 2 parts of the above cationic emulsion to 96 parts of water with agitation, and followed by the addition of 2 parts of stearato chromic chloride having a chromium to acid mole ratio of 2:1 and containing 5.7% chromium. A stable emulsion is obtained which gives comparable results to that of Example 1 when used as a coating for shipping containers for bananas.

*Example 3*

A solution containing a nonionic polyethylene emulsion and a chrome complex of stearic acid is prepared by adding 2 parts of "Poly-Em" 40, a nonionic polyethylene emulsion sold by Spencer Chemical Company, to 96 parts of water with agitation. To this mixture is added two parts of stearato chromic chloride, having a chromium to acid mole ratio of 2:1 and containing 5.7% chromium. A stable emulsion is obtained which exhibits similar properties to the emulsion of Example 1 when it is used to coat shipping containers for fruit.

*Example 4*

A formulation containing a cationic polyethylene emulsion and a chromium complex is prepared by adding 4 parts of the cationic emulsion prepared in Example 2 to 94 parts of water with agitation, followed by the addition of two parts of methacrylato chromic chloride having a chromium to acid mole ratio of 2:1 and containing 5.7% chromium. The resulting emulsion exhibits good stability and is an excellent sizing material for glass fibers.

*Example 5*

A solution containing a nonionic polyethylene emulsion and a chrome complex of perfluorooctanoic is prepared by adding two parts of the nonionic emulsion prepared in Example 1 to 96 parts of water with agitation. To this solution is added two parts of a chrome complex of perfluorooctanoic acid having a chromium to acid mole ratio of 4:1 and containing 4% chromium. A stable emulsion is obtained which exhibits similar properties to the emulsion of Example 1 when it is used to coat shipping containers for fruit.

*Example 6*

A formulation containing a nonionic polyethylene emulsion and a chrome complex of gallic acid is prepared by adding one part of the nonionic emulsion prepared in Example 1 to 97 parts of water with agitation. To this formulation is added two parts of a chrome complex of gallic acid having a chromium to acid mole ratio of 1:1 and containing 3% chromium. The emulsion exhibits good stability and similar mar-preventive properties to the emulsion of Example 1 when it is tested as in Example 1.

Example 7

A cationic composition of an emulsifiable polypropylene having a melting point in the 213 to 221° F. range is prepared as the polyethylene emulsion was prepared in Example 2. The emulsion contains 25 parts of emulsifiable polypropylene, 5 parts of a cationic emulsifier containing n-alkyl trimethylammonium chloride and 70 parts of water.

A formulation containing the cationic polypropylene emulsion and a chromium complex is prepared by adding 10 parts of the above cationic emulsion to 80 parts of water with agitation and following this by the addition of 10 parts of a chrome complex of myristic acid having a chromium to acid mole ratio of 2:1 and containing 5.7% chromium. The emulsion exhibits good stability and gives comparable results to those obtained in Example 1 when it is used as a coating for shipping containers for fruit.

Example 8

A formulation containing a cationic polypropylene emulsion and a chromium complex is prepared by adding 5 parts of the cationic emulsion prepared in Example 7 to 994 parts of water with agitation, followed by the addition of 1 part of a chrome complex of palmitic acid having a chromium to acid mole ratio of 2:1 and containing 5.7% chromium. A stable emulsion is obtained which exhibits mar-preventive properties similar to the emulsion of Example 1 when it is tested on shipping containers for fruit.

Example 9

A non-ionic polypropylene emulsion is prepared as the polypropylene emulsion was prepared in Example 7. The emulsion contains 25 parts polypropylene, 5 parts of polyoxyethylene modified fatty acid esters and 70 parts water.

A formulation is prepared by adding 15 parts of the above polypropylene emulsion to 65 parts of water with agitation and following that with the addition of 20 parts of a chrome complex of tannic acid having a chromium to acid mole ratio of 1:1 and containing 5% chromium. A stable emulsion is obtained which exhibits mar-preventive properties similar to the emulsion of Example 1.

Example 10

A cationic polypropylene emulsion is mixed with a chrome complex of methacrylic acid. The polypropylene emulsion used is that prepared in Example 7. Twenty parts of that emulsion are added to 65 parts of water with agitation. To this formulation is added 15 parts of methacrylato chromic chloride having a chromium to acid ratio of 2:1 and containing 5.7% chromium. The resulting emulsion exhibits good stability and mar-preventive properties similar to the emulsion of Example 1.

The invention claimed is:

A method of reducing shipping damage to fruit comprising coating the surface of the paperboard shipping container which contacts the fruit, with from 10 to 150 pounds per 10,000 square feet of surface of a composition consisting essentially of a material selected from the group consisting of polyethylene, polypropylene, and ethylene-propylene copolymers, said material being dispersed in a water phase containing an emulsifying agent selected from the group consisting of cationic and nonionic emulsifying agents, and from 0.1 to 20 percent based on the weight of composition of a water soluble organic Werner complex in which a trivalent chromium atom is coordinated with a carboxylic acid.

References Cited

UNITED STATES PATENTS

| | | | |
|---|---|---|---|
| 3,032,523 | 5/1962 | Jennings et al. | 260—29.6 |
| 3,102,822 | 9/1963 | Grotenhuis | 260—29.6 |

MURRAY TILLMAN, *Primary Examiner.*

W. J. BRIGGS, Sr., *Assistant Examiner.*